United States Patent Office 3,365,472
Patented Jan. 23, 1968

3,365,472
1 - (AMINO AND HYDROXY) - 4 - ANILINO - 3'- SULFO - ANTHRAQUINONES SUBSTITUTED WITH A FIBER REACTIVE GROUP AT THE 4'-POSITION
Arthur Buehler, Rheinfelden, and Hans Ulrich Schuetz, Basel, Switzerland, assignors to Ciba Limited, Basel, Switzerland, a Swiss company
No Drawing. Continuation-in-part of application Ser. No. 240,411, Nov. 27, 1962. This application Mar. 1, 1965, Ser. No. 436,266
Claims priority, application Switzerland, Nov. 29, 1961, 13,901/61
8 Claims. (Cl. 260—372)

ABSTRACT OF THE DISCLOSURE 1-amino- or 1-hydroxy-4-phenylaminoanthraquinone dyestuffs containing a sulfonic acid group and a fibre-reactive aliphatic acylamino group bound to the phenyl nucleus.

This is a continuation-in-part of our application Ser. No. 240,411, filed Nov. 27, 1962, and now abandoned.

The present invention provides new water-soluble dyestuffs of the formula (1)

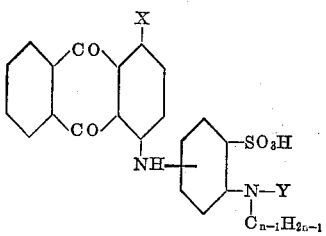

in which X represents a hydroxyl group or an amino group, $n$ represents a positive whole number of a value not greater than 5, and Y represents a reactive aliphatic acyl group, which is a member selected from the group consisting of an acryl-, a monohalogenoacryl-, a halogenacetyl-, β-halogenopropionyl-, and an α:β-dihalogenopropionyl radical.

A reactive acyl group is an acyl group capable of reacting with a fiber, that is, an acyl group which can react with the hydroxyl groups of cellulose, for example, with the formation of a covalent bond. Examples of such groups are α:β-unsaturated acyl radicals (such as the vinylsulfonyl, acryl, monochloroacryl and the HC≡C—CO groups) and acyl radicals containing removable substituents, such as those derived from aliphatic carboxylic acids or sulfonic acids containing in the aliphatic chain, advantageously in α-, β- and/or γ-position, an easily removable substituent that takes with it the pair of electrons that form the bond. As such radicals the following may be mentioned:

HO—SO₂O—CH₂CH₂—SO₂—, Cl—CH₂—CO—,
Cl—(CH₂)₂CO—, H₃C—SO₂—O—CH₂CH₂—CO—,
HO—SO₂—O—CH₂CH₂—CO—,

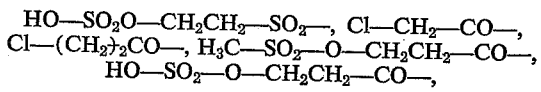

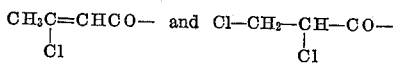

The invention also provides a process for the manufacture of dyestuffs of the Formula 1 by treating the appropriate dyestuffs containing a sulfonic acid group in the 2-position of the anthraquinone radical, that is to say, dyestuffs of the formula (2)

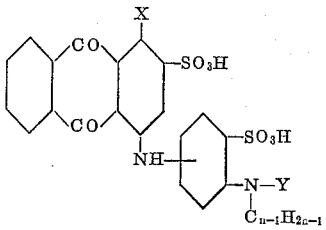

in which X, Y and $n$ have the meanings given in Formula 1, with reducing agents in a slightly acid to alkaline bath to split off the sulfonic acid group from the 2-position.

As anthraquinone dyestuffs which can be used as starting materials for the present process are mentioned more especially the acryl and chloro- or bromopropionyl derivatives of 1-amino-4-(4'-aminophenylamino)-anthraquinone-2:3'-disulfonic acid and 1-amino-4-(3'-aminophenylamino)-anthraquinone-2:4'-disulfonic acid containing a free amino group in the 1-position and in which the acryl or propionyl substituent is in the other amino group.

The treatment of the dyestuffs of the Formula 2 with reducing agents in accordance with the process of the invention is advantageously carried out in an aqueous medium, for example, in a slightly acid, neutral or alkaline medium, using sodium sulfide, sodium dithionite, hydroxyalkyl sulfinic acids, zinc or sodium formaldehyde sulfoxylate, glucose, fructose, galactose or cellulose xanthate. The treatment is advantageously carried out at a moderately raised temperature, for example, at 20 to 60° C. After removal of the sulfonic acid group from the 2-position the resulting dyestuffs can, if necessary, be reoxidized. Dyestuffs of the Formula 1 are thus obtained, even in those cases where the treatment with reducing agents not only brings about removal of the sulfonic acid group from the 2-position of the anthraquinone nucleus, but also causes a reduction of the anthraquinone dyestuff.

The products of the Formula 1 obtained by the process of the invention can also surprisingly be made by acylating dyestuffs of the formula (3)

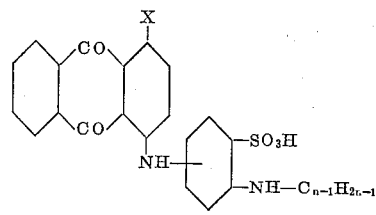

in which X and $n$ have the meanings given in Formula 1, with anhydrides or halides of aliphatic acids containing a reactive position in the aliphatic chain, that is to say, a position capable of reacting with fibrous material with the formation of a covalent bond.

As acylating agents of this kind are mentioned more especially acrylic acid chlorides, chloracetyl, chloro- or bromopropionyl and α:β-dichloropropionyl chloride or bromide.

The dyestuffs of the Formula 3 to be acylated in accordance with the invention are obtainable by the usual methods, for example, as described in German specification 541,266 to I. G. Farbenindustrie A.G., issued Jan. 6, 1932 or French specification 1,140,533 to Sandoz S.A., issued Mar. 4, 1957, from 1-amino-4-(aminophenylamino)-anthraquinone-2-sulfonic acids.

The acylation process in accordance with the invention is advantageously carried out in an aqueous medium in the presence of an agent capable of binding acid such as sodium carbonate or sodium or potassium hydroxide.

The acrylamino compounds corresponding with Formula 1 can also be prepared from the corresponding β-chloro- or β-bromo-propionylamino derivatives by the splitting off of hydrogen halide by means of an alkali.

The dyestuffs of the Formula 1 obtained by the process of the invention are new. They are suitable for dyeing or printing a very wide variety of materials, especially animal and synthetic fibers containing nitrogen such as polyamide and polyurethane fibers, silk and wool from a slightly acid, neutral or slightly alkaline bath. The dyeings and prints so obtained possess a good fastness to light and washing and, as a rule, are fast to perspiration and milling. The new dyestuffs have particularly good levelling properties.

Unless otherwise stated, the parts and percentages in the following examples are by weight, and the relationship of parts by weight to parts by volume is the same as that of the gram to the cubic centimetre.

*Example 1*

48.9 parts of 1-amino-4-(4'-aminophenylamino)-anthraquinone-2:3'-disulfonic acid were dissolved in 400 parts of water in the presence of about 4 parts of sodium hydroxide.

After the addition of 21.2 parts of sodium carbonate the solution was cooled to 0° C. by the addition of ice and 34 parts of β-chloropropionyl chloride were added at 0 to 5° C. After the acylation, the dyestuff was precipitated by the addition of sodium chloride and isolated by filtration.

The dyestuff paste so obtained was dissolved in 2000 parts of water at 50° C. and 19.2 parts of sodium hydrosulfite were added to the solution. After a short time a brown-yellow vat was formed to which were added 6.4 parts of sodium hydroxide and the whole stirred for a long period. The dyestuff which slowly crystallized out was isolated and washed with a solution of sodium chloride. The dyestuff so obtained dyed wool in a neutral or slightly acid bath full, reddish blue tints possessing excellent properties of fastness.

*Example 2*

The dyestuff paste obtained as described in Example 1 was boiled under reflux for 10 minutes with a solution of 42.4 parts of sodium carbonate in 800 parts of water. From the cooled solution, optionally filtered to remove impurities, the resulting dyestuff was precipitated almost completely. The dyestuff so obtained was isolated, washed with a solution of sodium chloride and dried in vacuo at 50° C. It formed a blue powder that gave a blue solution in water and a violet solution in concentrated sulfuric acid. The dyestuff dyed wool in a neutral or slightly acid bath full, reddish blue tints possessing good properties of fastness.

Similar dyestuffs were obtained by using as starting materials the dyestuffs listed in Column I of the following table instead of the chloropropionylated dyestuff obtained as described in Example 1. Column II shows the tints obtained on cotton and wool.

| | I | II |
|---|---|---|
| 1 | 1-amino-4-[(4'-(N-methyl-N-(β-chloropropionyl)amino)-3'-sulfophenyl)amino]-anthraquinone (structure with NH$_2$, SO$_3$H, N(CH$_3$)—COCH$_2$CH$_2$—Cl) | Reddish-blue. |
| 2 | 1-amino-4-[(4'-sulfo-3'-(β-chloropropionylamino)phenyl)amino]-anthraquinone (structure with NH$_2$, NHCOCH$_2$CH$_2$—Cl, SO$_3$H) | Do. |
| 3 | 1-hydroxy-4-[(3'-sulfo-4'-(β-chloropropionylamino)phenyl)amino]-anthraquinone (structure with OH, SO$_3$H, NHCOCH$_2$CH$_2$Cl) | Violet. |
| 4 | 1-hydroxy-4-[(3'-sulfo-4'-(chloroacetylamino)phenyl)amino]-anthraquinone (structure with OH, SO$_3$H, NH—CO—CH$_2$—Cl) | Do. |

| | I | II |
|---|---|---|
| 5 | 1-amino-4-(aminophenyl)anthraquinone with SO₃H and N(C₂H₅)–CO–CH₂–CH₂–Cl substituents | Reddish-blue. |
| 6 | 1-amino-4-(aminophenyl)anthraquinone with SO₃H and N(CH₃)CO–CH=CH₂ substituents | Do. |
| 7 | 1-amino-4-(aminophenyl)anthraquinone with NH–CO–CH=CH₂ and SO₃H substituents | Blue. |
| 8 | 1-hydroxy-4-(aminophenyl)anthraquinone with SO₃H and NH–CO–CH=CH₂ substituents | Violet. |
| 9 | 1-amino-4-(aminophenyl)anthraquinone with SO₃H and NH–CO–CH₂–Cl substituents | Reddish-blue. |
| 10 | 1-amino-4-(aminophenyl)anthraquinone with SO₃H and N(CH₃)–CO–CH₂–Cl substituents | Do. |
| 11 | 1-amino-4-(aminophenyl)anthraquinone with SO₃H and NH–CO–CH(Br)–CH₂–Br substituents | Blue. |
| 12 | 1-amino-4-(aminophenyl)anthraquinone with NH–CO–C(Br)=CH₂ and SO₃H substituents | Do. |

| | I | II |
|---|---|---|
| 13 | 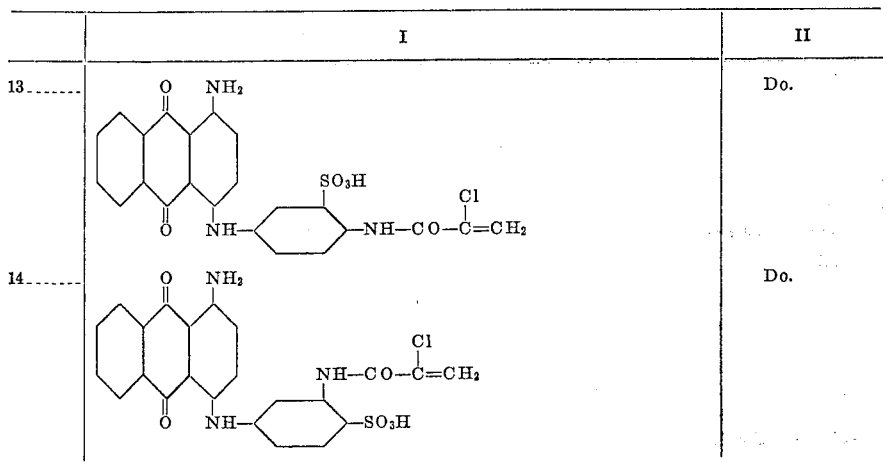 | Do. |
| 14 | | Do. |

*Example 3*

48.9 parts of 1-amino-4-(4'-aminophenylamino)-anthraquinone-2:3'-disulfonic acid were dissolved in 1000 parts of water at 50° C., and the solution neutralized with about 4 parts of sodium hydroxide. 19.2 parts of sodium hydrosulfite were then sprinkled in, the whole stirred for 15 minutes, whereupon 16 parts of sodium hydroxide were added and stirring continued for two hours while the temperature was allowed to drop. The resulting dyestuff, desulfonated at the 2-position, was precipitated by the addition of sodium chloride, isolated by filtration, and washed with a solution of sodium chloride.

The dyestuff paste so obtained was dissolved in 2000 parts of water at 70° C. The solution was cooled to 0° C. by the addition of ice and then 21.2 parts of sodium carbonate and 34 parts of β-chloropropionyl chloride were added simultaneously. After the acylation, the dyestuff was precipitated by the addition of sodium chloride and isolated by filtration. It possessed the same properties as the dyestuff described in Example 1 and dyed wool reddish blue tints.

The dyestuff was converted into the acryl derivatives and worked up in a manner analogous to that described in Example 2. The dyestuff so obtained exhibited the same dyeing properties as the dyestuff prepared as described in Example 2.

DYEING PRESCRIPTION 100 parts of a wool embroidery yarn were entered, at 50 to 80° C., into a dyebath containing 10 parts of crystallized sodium sulfate, 6 parts of 40% acetic acid and 2 parts of the dyestuff prepared as described in Example 1 in 3000 parts of water. The dyebath was brought to the boil in the course of 30 minutes and dyeing continued at the boil for one hour. The wool was then rinsed and dried. A level reddish blue dyeing was obtained.

What is claimed is:

1. An anthraquinone dyestuff of the formula

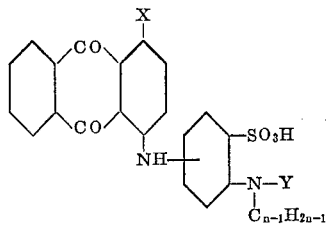

in which X represents a member selected from the group consisting of a hydroxyl and an amino group, $n$ represents a positive whole number up to 5 and Y represents a member selected from the group consisting of an acryl-, a monohalogenoacryl-, a halogenacetyl-, β-halogenopropionyl-, and an α:β-dihalogenopropionyl radical.

2. The dyestuff of the formula

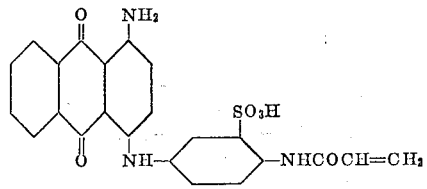

3. The dyestuff of the formula

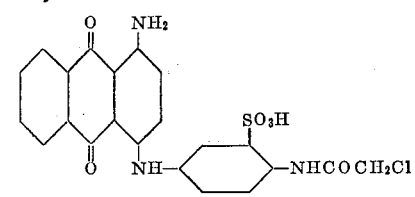

4. The dyestuff of the formula

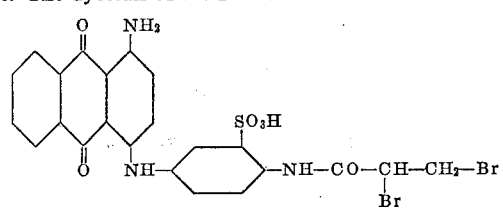

5. The dyestuff of the formula

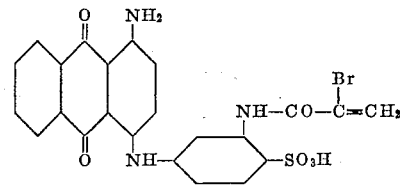

6. The dyestuff of the formula

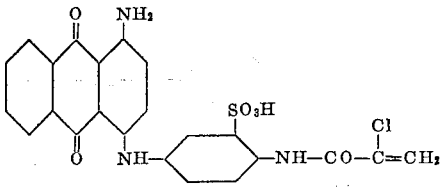

7. The dyestuff of the formula

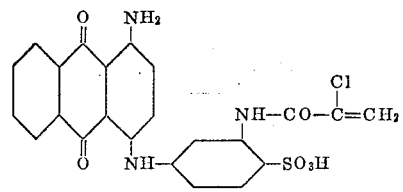

8. The dyestuff of the formula
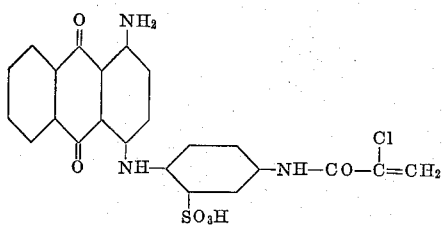
References Cited
UNITED STATES PATENTS
1,927,125  9/1933  Kalischer et al. _____ 260—60
FOREIGN PATENTS
282,409  4/1928  Great Britain.
779,781  7/1957  Great Britain.
830,876  3/1960  Great Britain.
1,238,515  9/1959  France.
LORRAINE A. WEINBERGER, *Primary Examiner.*
H. C. WEGNER, *Assistant Examiner.*